Patented July 16, 1946

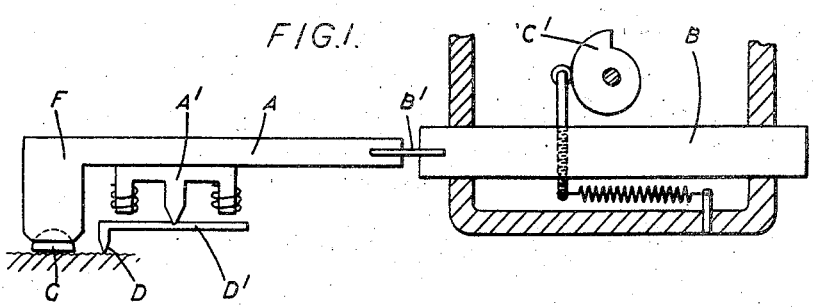
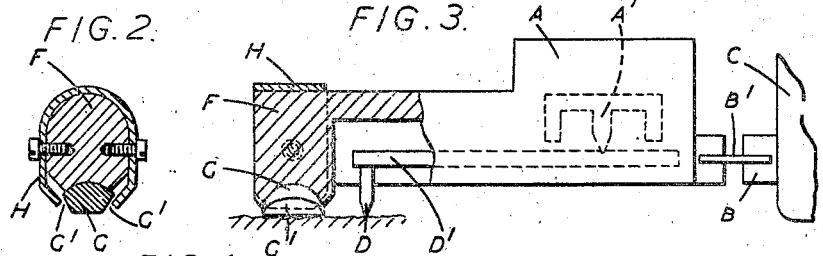
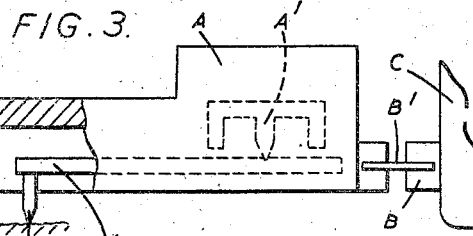
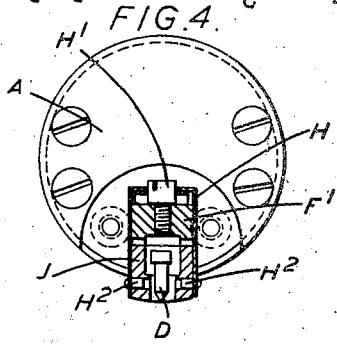
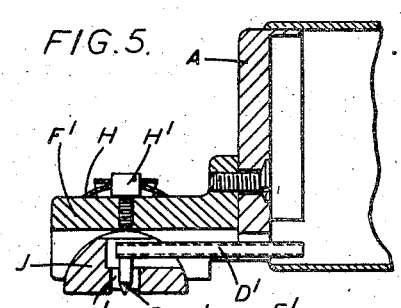
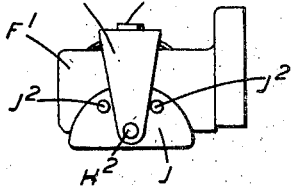
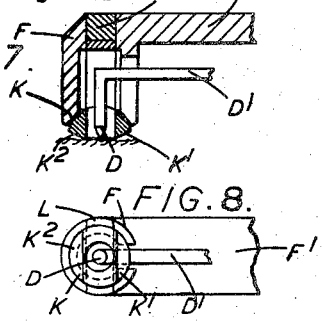
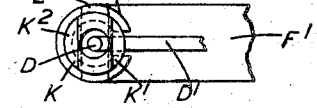

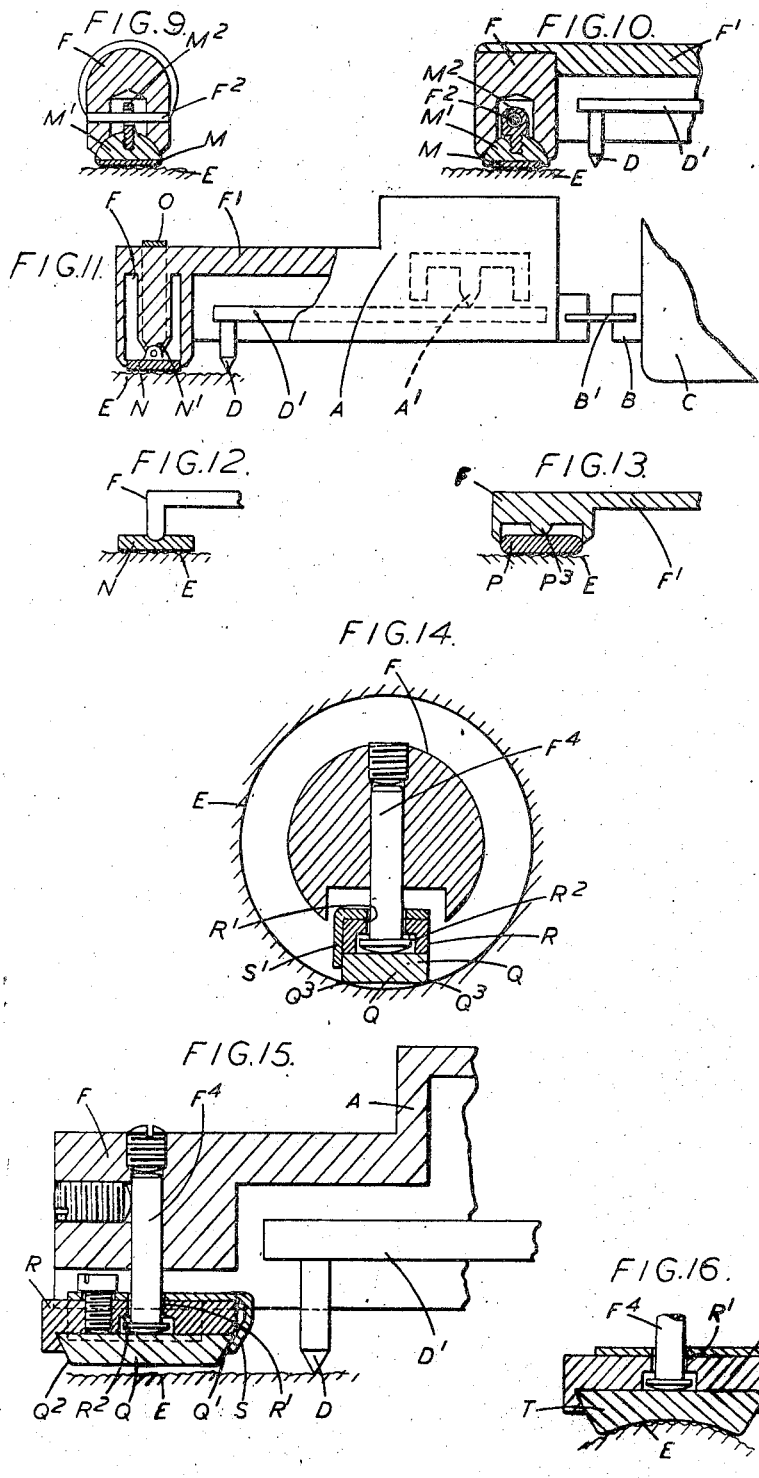

2,404,143

UNITED STATES PATENT OFFICE 2,404,143

APPARATUS FOR MEASURING OR INDICATING THE ROUGHNESS OR UNDULATIONS OF SURFACES

Richard Edmund Reason, Leicester, England, assignor to Taylor, Taylor & Hobson Limited, Leicester, England, a company of Great Britain Application December 30, 1944, Serial No. 570,725
In Great Britain September 22, 1943

14 Claims. (Cl. 73—105)

This invention relates to apparatus for measuring or indicating the roughnesses or undulations of a surface, wherein a stylus carried by a pick-up head is traversed along the surface to be tested and a detector device in the pick-up head responsive to the working movements of the stylus approximately normal to the test surface during traversing is employed to control a measuring or indicating instrument.

In such apparatus the pick-up head is often provided with a rounded or blunt-ended skid, which rides over the test surface during traversing and acts as a datum for measuring the working movements of the stylus. In theory, such a skid rises and falls over the "crests" of the waves of longer wave-length in the test surface, so that the instrument measures only the relatively short-wave roughness of the surface, but in practice, the measurement so obtained can give a false or misleading indication of the roughness, for example when certain relationships happen to exist between the wave-length of the undulations and the effective radius of the skid surface and the spacing between the skid and the stylus.

The present invention has for its object to provide an improved pick-up unit for such apparatus, which will greatly reduce the risk of false or misleading results, the exceptional cases in which such results can occur being readily recognisable.

The pick-up unit according to the invention comprises a stylus for engaging with the surface to be tested, a pick-up head carrying the stylus, a traversing member to which the pick-up head is flexibly connected and through which the drive is transmitted to the pick-up head for traversing the stylus along the test surface, a shoe or sole-plate freely mounted rotatably on the pick-up head and having a working face which engages with the test surface and is shaped to fit closely the nominal shape thereof in the direction of traversing, such working face constituting a datum for the working movements of the stylus approximately normal to the test surface during traversing, and a detector device in the pick-up head responsive to such working movements for controlling a measuring or indicating instrument. It should be made clear that the term "flexibly connected" is used to indicate a pivoted or other connection which, whilst properly transmitting the traversing drive to the pick-up head, will leave adequate freedom of movement approximately normal to the test surface to ensure that the shoe or sole-plate will remain in engagement with the surface during traversing.

For use with a plane test surface, the working face of the shoe may be flat or alternatively convexly curved in transverse section so as to provide line contact in the direction of traversing. The same working face can also be used for a convex cylindrical test surface when the direction of traversing is to be parallel to the generators of the test surface cylinder, and generally also for any convex rule surface for which straight-line traversing is required.

A concave cylindrical test surface requiring straight-line traversing can be dealt with by providing flats at the sides of the shoe so that the edges of the working face constitute straight guide rails for running along the surface. Such an arrangement is of general applicability to concave cylindrical surfaces of any curvature, provided of course that the measuring or indicating instrument or the transmission of the measurement from the detector device thereto allows for a backing-off or zeroising adjustment to ensure that the reading can be brought within the scale of the instrument. If the working face is convexly curved in transverse section shallow concave test surfaces of less curvature than the working face can be dealt with, without the necessity for using such guide rails.

For test surfaces requiring a curved traverse, as for example spherical surfaces or cylindrical surfaces to be tested transversely to the generators, the working face of the shoe should have a curved section in the direction of traversing of the same curvature as the test surface, thus calling for a special shoe for each size and shape of test surface.

Although the shoe may be mounted on pivot pins on the pick-up head, it is preferable for the inner face of the shoe, or alternatively of a supporting member on which the shoe is detachably mounted, to be formed as or provided with a bearing surface in engagement with a cooperating surface in a housing formed in or carried by the pick-up head. The cooperating bearing surfaces may be in sliding or in rolling engagement with one another. In the case of sliding engagement, the bearing surface in the housing may consist of a seating edge or pair of edges or (in the case of a spherical bearing surface on the shoe) of a conical or pyramidal recess, but usually it will be preferable for the housing to be in the form of a cup of circular section closely fitting the bearing surface of the shoe or of the supporting member. In one convenient arrangement the shoe is mainly or wholly in the form of a segment of a sphere having a spherical bearing surface and a flat working face. In another convenient arrangement the shoe is generally in the form of a flat plate provided on its inner face with a convex or concave bearing surface of relatively small size in sliding engagement with a corresponding bearing surface in the housing, thus reducing the frictional resistance to the movement of the shoe in its bearing whilst still retaining a relatively large working face.

In the case of rolling engagement, the shoe may be of various forms, but it will usually be most convenient to make it generally in the form of a plate with its working face suited to the nominal shape of the test surface and its inner surface in rolling engagement with a convex surface in the housing. In one especially convenient arrangement, the plate-like shoe is detachably mounted in a block and its inner face engages with the convex end of a rod carried by the pick-up head and projecting through an opening in the block.

When a sliding bearing is employed, the suction effect of a layer of grease between the cooperating bearing surfaces will sometimes suffice for holding such surfaces in engagement. Alternatively, or in addition (and also when a rolling bearing is used), the shoe or its supporting member may be made partly or wholly of magnetic material, a magnetic force being employed for holding or assisting to hold the bearing surfaces in engagement. In either event, it will usually be desirable to provide a stop or stops to limit the relative movement between the shoe and the housing and to prevent the shoe from coming completely out of the housing. Such stop or stops may consist of a suitable clip or of one or more pins carried by the pick-up head and each loosely engaging in a recess in the shoe or supporting member or in a loop carried thereby. In the case when the shoe is detachably mounted in a block with its inner face in rolling engagement with the end of a rod carried by the pick-up head, such limiting stops may be provided by cooperating shoulders on the rod and in the opening in the block.

In practice, it is found that the short wavelength undulations of the surface, generally described as "roughness," are superimposed on a periodic undulation of markedly greater wavelength, usually described as "waviness." The wavelength and the wave form of the longer-wavelength undulations depend on the machine which has been used to produce the surface, and are in practice often fairly regular. Sometimes it is adequate for the purpose for which the measurement is required to ignore the waviness and to obtain an accurate measure of the roughness alone, especially if at the same time an indication (though not necessarily an accurate measure) is given of the presence of any longer wave-length waviness, but it is usually better to reveal the whole nature of the surface, including the waviness. Such a result can be readily obtained from the apparatus according to the present invention.

Thus, taking by way of example the case of a hemispherical shoe for use on a test surface requiring a straight-line traverse, it will be clear that the flat working face will ride on the crests of undulations whose wave-length is not greater than the radius of the hemisphere, and if there are no undulations of longer wave-length in the surface the traverse will be effected without any displacement at all of the shoe normal to the surface. In this simple case, the shoe will adjust itself to the surface and will give an exact reference datum for the working movements of the stylus throughout the traverse, and a highly accurate indication will be obtained of the exact contour of the surface. It will be appreciated that this high degree of accuracy results from the fact that the working face of the shoe corresponds in shape to the nominal shape of the test surface, and that the same accuracy would be obtained with a test surface requiring a curved traverse, when the working face of the shoe is curved to fit the nominal shape of the test surface in the direction of traversing. For such correspondence of shape prevents displacement of the shoe normal to the surface in all cases when the wave-length of the undulations of the surface is less than the effective radius of the bearing face of the shoe, owing to the fact that in practice the crests of the undulations all have substantially the same amplitude.

In surfaces in which there is in the course of the traverse the crest of an undulation of longer wavelength and greater amplitude than the crests of the shorter waves, the shoe will tilt when such crest is reached and will ride over it. This will of course falsify the reading of the instrument, but in practice such falsification is readily recognisable. Thus for these longer wavelengths, if the crests are comparatively sharp, as may happen for example when the surface has been produced by a turning operation, the reading obtained in the instrument will be unreliable, since the position of the shoe will be indeterminate when it is passing over the sharp crest, but such sharp crests can in practice often be recognised by eye on the surface and, even if not, the presence of a periodic disturbance on the graph (if the indication is obtained on, say, a pen-recorder) having a wavelength greater than the radius of the shoe will show that the limitations of the instrument are being exceeded. If on the other hand the long-wave crests are gradually sloping, as may commonly result from a grinding operation, so that they are not readily obvious to the eye, there is no serious indeterminacy in the position of the shoe as it rides over the crest, and the resultant reading (although not a true indication of the exact contour of the surface) does give an accurate indication of the "roughness" of the surface, ignoring the long-wave "waviness," and moreover an inspection of the resultant graph will usually show to the experienced eye that there is some long-wave disturbance in the record. In practice it is sometimes convenient to provide a slight chamfer on the leading and trailing edges of the working face of the shoe, in order to spread and to render more gradual the effect of a long-wave crest on the reading.

The long-wave waviness undulations can themselves be measured, in an analogous manner, by the use of an appropriately larger shoe and an increased length and speed of traverse with correspondingly reduced magnification in the instrument.

The invention may be carried into practice in various ways, but some convenient practical arrangements according thereto are illustrated by way of example in the accompanying drawings, in which Figure 1 shows diagrammatically one simple arrangement employing a hemispherical shoe in sliding engagement in the housing in the pick-up head.

Figures 2 and 3 illustrate a modification of the arrangement of Figure 1,

Figures 4 to 6 show a variant employing a hemicylindrical shoe,

Figures 7 and 8 illustrate a further modification of the arrangement of Figure 1, Figures 9 and 10 show another modified arrangement having a detachable shoe, Figure 11 illustrates an alternative arrangement employing a shoe generally in the form of a flat plate with a relatively small sliding bearing, Figure 12 shows a modification of the arrangement of Figure 11, Figure 13 shows a further modification of the arrangement of Figure 11 employing a rolling bearing, Figures 14 and 15 illustrate a preferred rolling bearing arrangement with a readily detachable flat shoe, and Figure 16 shows the use of a curved shoe in the arrangement of Figures 14 and 15.

In the arrangement of Figure 1, the pick-up head indicated diagrammatically by an arm A is pivoted by a spring ligament hinge B¹ to a bar B, which projects from a casing C containing suitable driving mechanism (part of which is shown at C¹) and is driven by such mechanism in the direction of its length at the appropriate speed for traversing the stylus D over the surface E to be tested. The pick-up head A carries the detector device, which may conveniently consist of a three-limbed electromagnet A¹ whose armature is mounted on a lever arm D¹ pivoted to the centre limb of the electromagnet and carrying the stylus D at its end.

The pick-up head A also carries a housing F just beyond the stylus D having a cup-shaped recess within which closely fits a hemi-spherical shoe G. A layer of grease between the bearing surfaces of the shoe G and the cup-shaped recess in the housing is relied upon to provide the necessary holding force for retaining the shoe in the housing, whilst still leaving the shoe free to slide as may be required in its bearing. The working face of the shoe G is shown flat for engagement with a flat test surface.

In the modification illustrated in Figures 2 and 3, the housing F is carried on a channel-shaped arm F¹ which shields the stylus arm D¹ from damage and projects from a compartment containing the electromagnet A¹. The shoe G is again mainly hemi-spherical in shape but with its sides cut away at G¹ to form flats which constitute guide rails to enable the shoe to be used for testing the internal surfaces of small cylindrical holes. A springy saddle H secured around the housing F has its relatively broad ends lying close to the flats G¹ on the shoe G to act as a retainer if the suction effect of the grease layer should fail to hold the shoe in the housing, and also to provide springy stops limiting rotation of the shoe in its bearing in all directions of movement. In other respects the arrangement is similar to that of Figure 1.

Although the use of a spherical bearing surface will usually be preferable since it permits slight lateral tilting of the shoe (which may be convenient for example with a cylindrical test surface when it is desired to make traverses along a number of generators of the surface without intermediate readjustment), a cylindrical bearing surface with its axis lying at right angles to the traversing plane may be used, if desired, and Figures 4 to 6 show by way of example an arrangement employing a hemi-cylindrical shoe J.

In this arrangement, the webs of the channel-shaped arm F¹ are cut away to form circular seatings forming bearings for the shoe J about its transverse axis. Part of the upper surface of the shoe J is cut away to form a space into which the front end of the stylus arm D¹ projects, the stylus D itself in this instance being shown as passing freely through a hole J¹ cut centrally through the shoe. The shoe is held in position by a springy saddle H secured to the top of the arm F¹ at H¹ and carrying pins H² engaging with slight clearance in holes in the ends of the half cylinder J, such holes lying close to the working face of the shoe and consequently only slightly above the axis thereof. The ends of the shoe also carry pins J² projecting on either side of the saddle H and constituting stops to limit the rotational movement of the shoe in its bearing. The working face of the shoe may be flat or, as shown, may have slight curvature in section transverse to the direction of traversing (that is in longitudinal section with respect to the axis of the half cylinder), so that it will make line contact in the direction of traversing with the test surface E. The edges of the flat ends of the half cylinder J may be rounded to provide guide rails for use with a concave cylindrical test surface.

In the foregoing arrangements, the suction effect of a layer of grease or a spring clip or both are employed to hold the shoe in its seating in the housing, but other means may be used for this purpose, such for example as a magnetic force, as illustrated in Figures 7 and 8 or a pin passing through a loop carried by the shoe as shown in Figures 9 and 10.

The arrangement of Figures 7 and 8 is generally similar to that of Figures 4 to 6 except that a hemi-spherical shoe K is employed in place of the hemi-cylindrical shoe, and that a permanent magnet L is inserted into the housing F, the shoe being made of magnetic material, so that the magnetic force aids the suction effect of the grease layer in holding the shoe in its bearing. Both in this arrangement and in the arrangements of Figures 2 and 3 and of Figures 4 to 6 the bearing in the housing against which the shoe engages may consist merely of an edge or edges or of a conical or tetrahedral surface. A conical bearing surface is shown by way of example in the drawings.

Figures 7 and 8 also serve to illustrate a further modification, generally applicable to all the arrangements described, wherein the leading and following edges of the working face of the shoe in the direction of traversing are slightly chamfered off, as at K¹ and K², to spread out the effect of any relatively large irregularity in the test surface E. A generally similar effect can be obtained by rounding off the edges of the shoe.

Figures 9 and 10 show not only the pin and loop holding device above mentioned but also a further variant in which the shoe is made in two parts M M¹, one of which M¹ constitutes a supporting block provided with the bearing surface engaging in the housing F, whilst the other M constitutes the shoe proper having the working face for engagement with the test surface E. The part M consists of a flat plate having shaped edges for engagement in a dovetail recess in the block M¹, so that the plate M can be readily detached from the block, if desired, and interchanged with an alternative plate having a working face cylindrically curved to suit a circular arc traverse for use with a curved test surface. The upper surface of the block M¹, in this case shown as hemi-spherical, engages with the bearing surface in the housing F and carries a loop M², through which a pin F² carried by the housing F passes loosely, this pin extending in a direction transverse to the traversing plane. The loop and pin also afford stops for limiting the rotational movement of the shoe.

In the alternative construction shown in Figure 11, the shoe is in the form of a flat plate N with a bearing projection N¹ in the middle of its inner face engaging in a complementarily shaped bearing recess in the housing F on the pick-up head A. In the example shown a spring clip O, having pins engaging in the sides of the shoe and approximately aligned with the centre of the bearing surface, is employed for retaining the shoe in position, although other means analogous to those above described may be used. The bearing projection N¹ may be hemi-spherical or may consist of a hemi-cylindrical rib running transversely across the inner face.

Alternatively, as shown in Figure 12, the bearing surface in the housing F may be convex and hemi-spherical or hemi-cylindrical and may engage in a complementarily shaped recess in the inner face of the shoe N.

Such arrangements will provide a sliding bearing, of circular section in the traversing plane, to enable the shoe to adjust itself rotationally in the pick-up head in a manner analogous to that above described, the smaller bearing surface enabling frictional resistance to be reduced without restricting the effective area of the working face. The shoe is preferably such that its side edges can be employed as guide rails for use on concave cylindrical test surfaces. Stops, not shown, are preferably provided to limit the movement of the shoe.

These arrangements may be modified to employ a rolling bearing instead of a sliding bearing, and Figure 13 shows one such modification by way of example. In this case, both faces of the shoe P may be flat, the inner face engaging with the surface of a convex projection F³ from the housing F so as to roll around such projection, with or without slight relative sliding movement. A magnetic force may be employed to hold the shoe in engagement with the housing bearing, or alternatively the weight of the pick-up head may be relied upon for this, stops being provided to limit the relative movement as in the above arrangements. This construction may be modified by providing the convex projection on the shoe to engage with a flat bearing surface in the housing, and a rolling bearing may likewise be employed with a hemispherical or hemicylindrical shoe.

Figures 14 and 15 illustrate an especially convenient arrangement employing a rolling bearing. In this arrangement, the shoe Q is in the form of a flat plate, which may be made for example of metal or of glass or quartz. This plate Q is bevelled at its leading and trailing edges Q¹ Q² and is carried in a block R provided with undercut bevelled surfaces, so that the shoe can be removed laterally from the block, when desired. The block R has an opening R¹ above the middle portion of the inner face of the shoe to receive the end of a rod F⁴ secured in the pick-up head A. The end of the rod F⁴ is convexly rounded to provide a rolling bearing surface engaging with the inner face of the shoe Q, and is provided with shoulders which can abut against shoulders R² in the opening R¹ in the block to limit the rotational movement of the shoe and to prevent the shoe and block from becoming completely detached from the pick-up head. The bevel at one end of the block R may be provided, as shown, of a spring clip S carried by the block, instead of on the block itself, thereby affording a spring grip to hold the shoe in position in the block. Such clip S may be bent over at one side to provide a stop S¹ for facilitating inserting the shoe in the correct position in the block. This arrangement has the advantage that worn shoes can be quickly and easily replaced and that a number of alternative shoes can be readily interchanged to suit the surface to be tested, for example to provide an appropriately curved working face for use when a curved traverse is required. Figure 16 illustrates one such curved plate T in position. The side edges of the shoe Q may be rounded at Q³ to provide guide rails for use on a concave test surface.

It will be appreciated that the foregoing arrangements have been described by way of example only, and that modifications described in connection with one construction only are in most instances equally applicable to other constructions, as will be readily obvious without further description. In particular, the various constructions have been illustrated and described with respect to the use of a shoe having a flat working face for use with a straight traversing movement, but it will be clear at once that the arrangements can all be modified to employ a curved working face, as exemplified by Figure 16, for use with a circular arc traversing movement.

What I claim as my invention and desire to secure by Letters Patent is:

1. A pick-up unit for use in apparatus for measuring or indicating the roughnesses or undulations of a surface, comprising a stylus for engaging with the surface to be tested, a pick-up head carrying the stylus, a traversing member for transmitting motion to the pick-up head for traversing the stylus along the test surface, a flexible connection between the traversing member and the pick-up head, a shoe freely mounted rotatably on the pick-up head and having a working face which engages with the test surface and is shaped to fit closely the nominal shape of the test surface in the direction of traversing, such working face constituting a datum for the working movements of the stylus approximately normal to the test surface during traversing, and a detector device in the pick-up head responsive to the working movements of the stylus and acting to convert such movements into electrical energy from which the measurement or indication can be obtained.

2. A pick-up unit for use in apparatus for measuring or indicating the roughnesses or undulations of a surface, comprising a stylus for engaging with the surface to be tested, a pick-up head carrying the stylus, a traversing member for transmitting motion to the pick-up head for traversing the stylus along the test surface, a flexible connection between the traversing member and the pick-up head, a bearing surface on the pick-up head of circular section parallel to the traversing plane, a shoe having a working face shaped to fit closely the nominal shape of the test surface in the traversing plane and having an inner face constituting a bearing surface in sliding engagement with the bearing surface on the pick-up head, the working face of the shoe constituting a datum for the working movements of the stylus approximately normal to the test surface during traversing, and a detector device in the pick-up head responsive to the working movements of the stylus and acting to convert such movements into electrical energy from which the measurement or indication can be obtained.

3. A pick-up unit as claimed in claim 2, in which the shoe is generally in the form of a segment of a sphere having a flat working face and a spherical bearing face, the bearing surface on the pick-up head being in the form of a spherical cup closely fitting the bearing face of the shoe.

4. A pick-up unit as claimed in claim 2, in which the shoe is generally in the form of a segment of a sphere having a flat working face and a spherical bearing face, the bearing surface on the pick-up head being in the form of a spherical cup closely fitting the bearing face of the shoe, the cooperating bearing surfaces being held in engagement at least in part by the suction effect of a layer of grease between them.

5. A pick-up unit as claimed in claim 2, in which the shoe is held in position at least in part by the suction effect of a layer of grease between the cooperating bearing surfaces between the shoe and the pick-up head.

6. A pick-up unit as claimed in claim 1, in which a magnetic device is arranged to exert force tending to hold the shoe in position in the pick-up head.

7. A pick-up unit as claimed in claim 2, in which a magnetic device is arranged to exert force tending to hold the cooperating bearing surfaces between the shoe and the pick-up head in engagement.

8. A pick-up unit as claimed in claim 1, in which the leading and trailing edges of the shoe in the direction of traversing are slightly chamfered to smooth out the effect of any relatively large projections in the test surface.

9. A pick-up unit as claimed in claim 1, in which the side edges of the working face of the shoe are shaped to constitute guide rails for engagement with a concave test surface.

10. A pick-up unit as claimed in claim 2, in which flats are provided at the sides of the shoe so that the side edges of the working face thereof constitute guide rails for engagement with a concave test surface.

11. A pick-up unit for use in apparatus for measuring or indicating the roughnesses or undulations of a surface, comprising a stylus for engaging with the surface to be tested, a pick-up head carrying the stylus, a traversing member for transmitting motion to the pick-up head for traversing the stylus along the test surface, a flexible connection between the traversing member and the pick-up head, a bearing surface on the pick-up head, a shoe mounted to roll on such bearing surface and having a working face which engages with the test surface and is shaped to fit closely the nominal shape of the test surface in the direction of traversing, such working face constituting a datum for the working movements of the stylus approximately normal to the test surface during traversing, and a detector device in the pick-up head responsive to the working movements of the stylus and acting to convert such movements into electrical energy from which the measurement or indication can be obtained.

12. A pick-up unit as claimed in claim 2, in which the shoe is generally in the form of a flat plate provided on its inner face with a bearing surface of relatively small size in sliding engagement with the bearing surface on the pick-up head.

13. A pick-up unit as claimed in claim 11, in which the shoe is generally in the form of a plate with its inner face in rolling engagement with a convex bearing surface on the pick-up head.

14. The combination with the features claimed in claim 11, of a block in which the shoe is detachably mounted, and a rod having a convex end carried by the pick-up head and projecting through an opening in the block, the shoe being in the form of a plate whose inner face is in rolling engagement with the bearing surface constituted by the convex end of the rod.

RICHARD EDMUND REASON.